United States Patent [19]

Fredriksen

[11] Patent Number: 4,491,034
[45] Date of Patent: Jan. 1, 1985

[54] HYDRAULIC-MECHANICAL TRANSMISSION SYSTEM HAVING OUTPUT BRANCHES

[75] Inventor: Nils Fredriksen, Harsewinkel, Fed. Rep. of Germany

[73] Assignee: Claas OHG, Harsewinkel, Fed. Rep. of Germany

[21] Appl. No.: 610,173

[22] Filed: May 14, 1984

Related U.S. Application Data

[63] Continuation of Ser. No. 315,994, Oct. 28, 1981.

[30] Foreign Application Priority Data

Nov. 6, 1980 [DE] Fed. Rep. of Germany ....... 3041865

[51] Int. Cl.³ .................... F16H 47/04; F16H 37/06
[52] U.S. Cl. ................................. 74/687; 74/681
[58] Field of Search .............. 74/681, 687, 701, 740

[56] References Cited

U.S. PATENT DOCUMENTS

| 3,744,344 | 7/1973 | Olsen et al. | 74/687 |
| 3,903,755 | 9/1975 | Polak | 74/687 |
| 3,969,958 | 7/1976 | Miyao et al. | 74/687 |
| 4,008,628 | 2/1977 | Orshansky, Jr. | 74/681 |
| 4,313,351 | 2/1982 | Hagin | 74/740 |
| 4,341,132 | 7/1982 | Burdick | 74/681 |

FOREIGN PATENT DOCUMENTS

| 2415002 | 10/1974 | Fed. Rep. of Germany | 74/687 |
| 997085 | 6/1965 | United Kingdom | 74/687 |
| 0644642 | 1/1979 | U.S.S.R. | 74/687 |

Primary Examiner—Allan D. Herrmann
Assistant Examiner—Dirk Wright
Attorney, Agent, or Firm—Michael J. Striker

[57] ABSTRACT

A continuously adjustable hydraulic-mechanical power transmission system has a mechanical part including an input shaft, forward gear and reversing gear controlled respectively by clutches for coupling with the input shaft; a planetary gear set has an annulus acting as a first shaft in continuous engagement with the forward gear and the reversing gear, a cage connected to a second shaft acting as an output of the system, and a sun wheel connected to a third shaft. The hydraulic part of the system includes an adjustable positive displacement hydraulic unit and a fixed displacement hydraulic unit hydraulically connected to the adjustable unit; the adjustable hydraulic unit is permanently connected to the reversing shaft of the mechanical unit and is hydraulically connected to the fixed displacement hydraulic unit, the range of the output rotational speed of the system always starts at one extreme adjusting position of the adjustable unit and ends at the opposite adjusting position of this unit for both directions of rotation.

4 Claims, 1 Drawing Figure

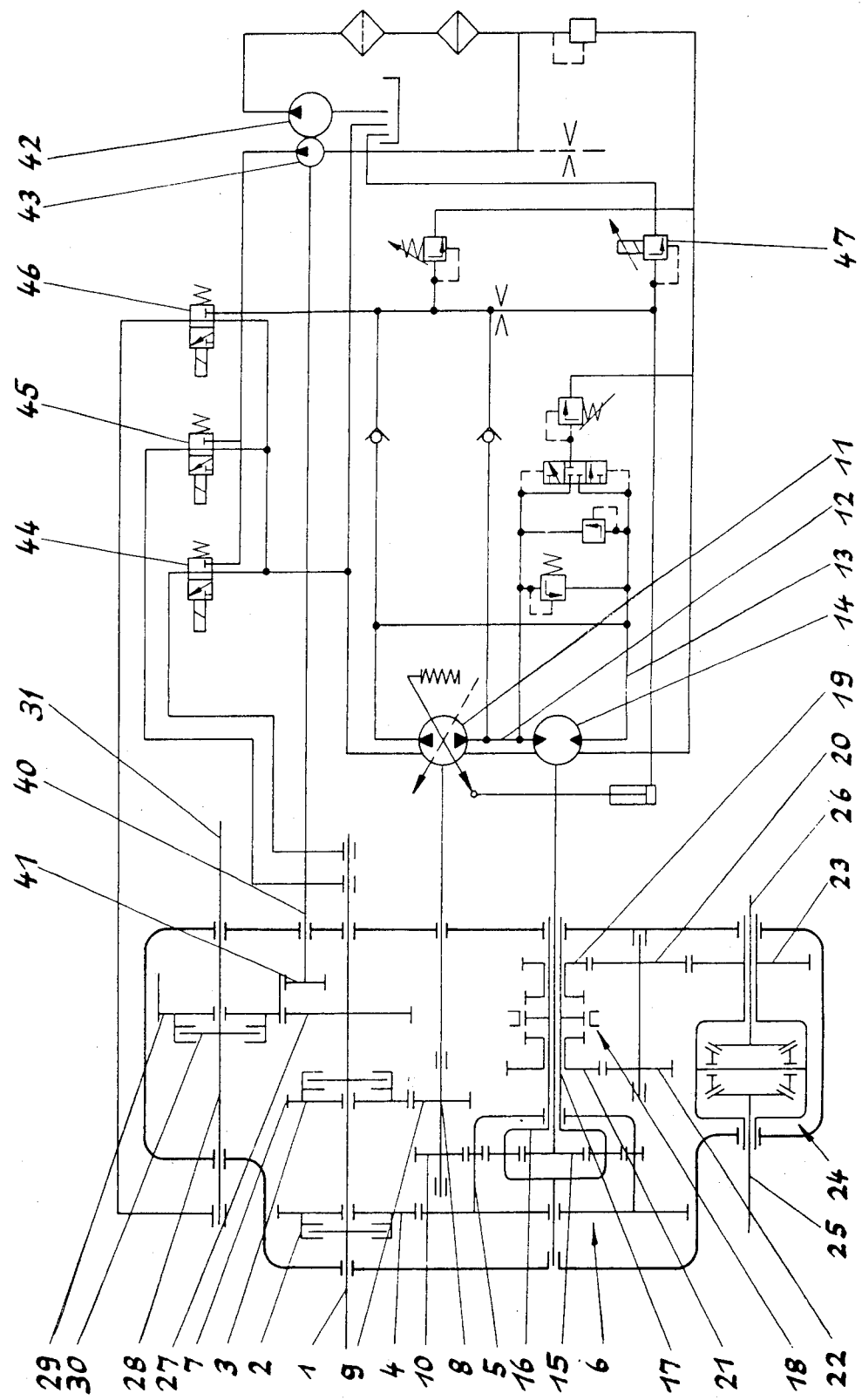

HYDRAULIC-MECHANICAL TRANSMISSION SYSTEM HAVING OUTPUT BRANCHES

This application is a continuation of application Ser. No. 315,944, filed Oct. 28, 1981.

BACKGROUND OF THE INVENTION

The present invention relates in general to continuously adjustable hydraulic-mechanical power transmissions having branched power outputs, and in particular to a transmission of the type which includes an input shaft cooperating with two clutches, a reversing shaft, a planetary gear set having three shafts of which one is selectively engageable by means of clutches either directly or via the reversing shaft with the input shaft, and a hydraulic transmission including a variable displacement hydraulic unit and a fixed displacement hydraulic unit, the second shaft of the planetary gear set being a secondary drive shaft, and the third shaft of the planetary gear set being directly connected to the fixed displacement hydraulic unit.

From German Pat. No. 2 415 002, a transmission is known which permits the same rotational speed at its output both in forward gear and in reverse gear. This known transmission consists of an adjustable hydraulic unit, of a fixed hydraulic unit, of a planetary gear set and of a reversing gear which is shiftable by means of a jaw clutch into forward, reverse or neutral position.

The adjustable hydraulic unit, the forward gear stage of the reversing gear, as well as the reversing stage of the reversing gear, are continuously in working connection with the input shaft of the transmission. The output shaft of the reversing gear is in engagement with the first shaft of the planetary gear set, the fixed hydraulic unit engages the second shaft, and the output shaft of the transmission engages the third shaft of the planetary gear set.

At full displacement of the adjustable hydraulic unit, the output shaft of the transmission stands still. If the displacement of the adjustable hydraulic unit is adjusted to lower values, the output shaft starts rotating. In continuing to reduce the displacement, a correspondingly increased rotational speed at the output is attained. When the adjustment of the adjustable hydraulic unit crosses zero, then the direction of rotation of the fixed hydraulic unit is reversed, resulting in a further increase of rotational speed at the output. The maximum rotational speed at the output of the transmission is obtained when full adjustment in the opposite direction is completed.

A substantial disadvantage of this known construction is in the mode of shifting from the forward to the reverse gear. Due to the fact that the toothed wheels of the reversing gear rotate in opposite directions for the forward and reverse motion, and a flawless engagement with the output shaft of the reversing gear is possible only upon synchronization, it is necessary that, upon disengaging a gear stage for one direction, the adjustable hydraulic unit be readjusted from one extreme position to the opposite extreme position before the other gear stage may be synchronously engaged. To meet this requirement, an expensive coupling between the clutch for the direction of movement and the adjusting means for the hydraulic unit is necessary. Moreover, such prior-art transmission does not enable a fast shift from one direction to the other, inasmuch as the readjustment of the hydraulic unit from one extreme angular position of its adjuster to the opposite extreme angular position takes always a certain amount of time. An additional disadvantage from the viewpoint of control technology is also to be seen in the fact that the two ranges of speed of movement start at opposite maximum angular positions of the adjustable hydraulic unit.

SUMMARY OF THE INVENTION

It is therefore a general object of the present invention to overcome the aforementioned disadvantages.

More particularly, it is an object of the invention to provide an improved power transmission system of the above described type, in which, on shifting over from one direction of movement to the other, the rotational direction of the variable displacement hydraulic unit is reversed and, consequently, the variable displacement hydraulic unit can be adjusted from the same maximum angular position of its adjuster for both directions of rotation of the transmission system.

In keeping with these objects and others which will become apparent hereafter, one feature of the invention resides, in a continuously adjustable transmission system of the aforedescribed type, in the provision of a constant work connection between the adjustable or variable displacement hydraulic unit and the reversing shaft.

The advantage of the solution according to this invention resides in the simplification of the control mechanism of the variable displacement hydraulic unit; an additional advantage is in the fast shiftover from one direction of rotation into the reverse one, this reversal being achieved by a very simple construction. The design simplification is to be seen in the fact that the reversing shaft is necessary in any case for the reversing gear, and the direct engagement of the variable hydraulic unit can be effected by very simple means.

According to another feature of this invention, the rotational range of the output of the transmission of this invention, starting from zero, begins for both rotational directions at the same maximum adjustment of the variable displacement hydraulic unit and ends at a corresponding opposite maximum adjustment of the variable hydraulic unit.

With advantage, a conventional two-ratio shift gear is arranged in the same housing of the mechanical part of the transmission system as is the driven shaft of the planetary gear set. In order to make it possible that both the front and the rear axle of a vehicle be activated, the transmission system of this invention is provided with two output shafts. The hydraulic displacement unit can be in a very simple manner attached from the outside to the housing of the mechanical part of the transmission. Alternatively, it is of course also possible to install the hydraulic part of the transmission, including the hydraulic drive units, in the housing of the mechanical part. To enable the driving of additional devices by the transmission of this invention, at least one auxiliary output shaft is provided for being driven by the full power of the motor.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE illustrates schematically the continuously adjustable hydraulic-mechanical power transmission system of this invention.

DESCRIPTION OF THE PREFERRED EMBODIMENT

The mechanical part of the transmission system includes a common housing and, within the housing, an input shaft 1 which supports two disk clutches 2 and 3 controlled respectively by pressure oil from a hydraulic part, as will be explained below. The clutch 2 is for forward rotation and the clutch 3 is for reversed rotation. If none of the clutches is activated, the positive coupling to the driven shaft is interrupted.

Gear 4 on clutch 2 directly engages the outer gear on annulus 5 of a planetary gear set 6, whereas gear 7 of reversing clutch 3 is in engagement with gear 9 of reversing shaft 8, which via gear 10 is in engagement with another gear on the annulus 5 of the planetary gear set. As a consequence, annulus 5 of the planetary set reverses its direction of rotation when the actuation of clutches 2 and 3 is changed. The same motion reversal applies to the adjustable positive displacement hydraulic unit 11 which is directly coupled to reversing shaft 8. Unit 11 is in direct connection via pressure oil channels 12 and 13 with fixed displacement hydraulic unit 14, the reversal of the rotational direction in the unit 11 causes the same reversal of rotational direction in the unit 14. The fixed displacement hydraulic unit 14 is directly connected to the sun wheel 15 of the planetary gear set 6. The planetary gearing is designed such that, at a maximum setting of the adjustable positive displacement unit 11, that is at maximum rotational speed of the sun wheel 15, the driven stage 16 of the planetary gear set has zero rotational speed. In reducing the setting of the displacement unit 11, the cage 16 starts rotating. When the adjustment of the variable displacement unit 11 is returned to its zero position, the rotational speed of cage 16 is half the maximum speed. An adjustment across the zero position produces a further increase in the rotational speed of cage 16, and the maximum rotational speed of the latter is attained at the full setting in the opposite direction of the adjustable variable displacement hydraulic unit 11.

The deceleration of the rotary speed of cage 16 is obtained by the opposite setting of the adjustable unit 11. For instance, if it is desired to reverse the direction of movement of a motor vehicle containing the transmission system of this invention, clutch 2 is released and clutch 3 is engaged. Due to the coupling of the adjustable hydraulic unit 11 to the reversing shaft 8, and due to the resulting reversal of the direction of rotation of the hydraulic unit 11, it is possible for either direction of movement to start the adjustment of the adjustable hydraulic unit 11 from the same maximum setting.

A two-ratio shift gear 18, shiftable by a jaw clutch is arranged on output shaft 17, which in turn is connected to cage 16 of the planetary gear set 6. Depending on which of the two speeds or ratios is selected, driving power passes via gears 19 and 20, or alternatively via gears 21 and 22, to a gear 23 on the output shaft of the transmission. The output shaft is connected to a lockable differential gear 24 of a conventional construction which drives two half shafts 23 and 25, one for the front axle and the other for the rear axle of a motor vehicle, for example.

In addition, the input shaft 1 is connected rigidly to a gear 27 which is in mesh with a gear 29 rotatable on a shaft 31. Gear 29 is positively connectable to the shaft 31 by means of a clutch 30 controlled similarly as clutches 2 and 3 by pressure oil from the hydraulic part. The shaft 28, together with its end portion 31 projecting from the housing of the mechanical part of the transmission system, is thus adapted to take over the full power of the transmission system and serves as an auxiliary shaft for driving additional functional devices mounted on the motor vehicle. Furthermore, an additional auxiliary shaft 40 is driven by the input shaft 1 for transmitting power to smaller loads. The additional auxiliary output shaft 40 is driven by gear 41, which is in continuous mesh with the gear 29. The auxiliary output shaft 40 is directly connected to a cooling oil pump 42 and to a feed pump 43 of the hydraulic part of the transmission system. Since the feed pump 43 always maintains a certain pressure in its feeding circuit, solenoid-controlled switching valves 44, 45 and 46 for actuating respective clutches 2, 3 and 30, as well as the solenoid-controlled proportional valve 47 for controlling the adjustment of the hydraulic unit 11, are connected to this feed circuit of the pump 43.

It will be understood that each of the elements described above, or two or more together, may also find a useful application in other types of constructions differing from the types described above.

While the invention has been illustrated and described as embodied in a hydraulic-mechanical transmission system in which the mechanical part is separated from the hydraulic part, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of generic or specific aspects of this invention.

What is claimed as new and desired to be protected by Letters Patent is set forth in the appended claims.

I claim:

1. A continuously adjustable hydraulic-mechanical power transmission system comprising a mechanical part including a power input shaft; a forward gear; a reversing gear; a first clutch for connecting said forward gear to said power input shaft; a second clutch for connecting said reversing gear to said input shaft; a reversing shaft with a gear engaging said reversing gear; a planetary gear set having an annulus formed with gears and acting as a first shaft; a cage for supporting satellite gears and acting as a second shaft, and a sun wheel in mesh with the satellite gears and acting as a third shaft; a hydraulic part including an adjustable displacement hydraulic unit and a fixed displacement hydraulic unit; the gears of said annulus being in mesh with said forward gear and with the gear of said reversing shaft to engage, in response to the actuation of one of said two clutches, said first shaft with said power input shaft either via said forward gear or via said reversing shaft and reversing gear; said second shaft of the planetary gear set acting as a driven shaft, and the third shaft of the planetary gear set being directly connected to the fixed displacement hydraulic unit; and the adjustable displacement hydraulic unit being in constant mechanical connection with said reversing shaft to reverse its rotational direction in response to the actuation of one of said two clutches and being hydraulically connected to said fixed displacement hydraulic unit.

2. A transmission system as defined in claim 1, wherein said adjustable displacement hydraulic unit has a zero position and two extreme adjustment positions each for setting rotational speed in opposite directions, whereby the range of output rotational speed, starting from zero, begins at the same extreme position of the adjustable hydraulic unit and ends at the same opposite extreme position.

3. A power transmission system as defined in claim 1, further including a two-ratio shift gear arranged in the housing of the mechanical part and connected to the second shaft of said planetary gear set.

4. A power transmission system as defined in claim 3, further including a differential gear having a cage engageable with said two-ratio shift gear and two half shafts controlled by said shift gear.

* * * * *